United States Patent [19]

Weber

[11] Patent Number: 5,366,530
[45] Date of Patent: Nov. 22, 1994

[54] METHOD AND APPARATUS FOR FABRICATING AN OVAL CROSS-SECTIONAL OPTICAL WAVEGUIDE

[75] Inventor: Dieter Weber, Kornwestheim, Germany

[73] Assignee: Alcatel, N.V., Amsterdam, Netherlands

[21] Appl. No.: 46,983

[22] Filed: Apr. 13, 1993

[30] Foreign Application Priority Data

Apr. 15, 1992 [DE] Germany .............................. 4212602

[51] Int. Cl.⁵ ............................................ C03B 37/075
[52] U.S. Cl. ...................................... 65/403; 65/17.4; 65/510; 65/531
[58] Field of Search ........................ 65/2, 3.12, 12, 182

[56] References Cited

U.S. PATENT DOCUMENTS

| | | | |
|---|---|---|---|
| 3,982,916 | 9/1976 | Miller | 65/3.12 |
| 4,184,859 | 1/1980 | Maklad | 65/2 |
| 4,331,462 | 5/1982 | Fleming et al. | 65/3.12 |
| 4,405,655 | 9/1983 | Tuin | 427/38 |

OTHER PUBLICATIONS

Essay: "Production of preforms for optical fibers", vol. 62, No. ¾, Electrical Communications of 1988 Technical Journal Published Quarterly by Alcatel NV 1988 pp. 235–241.

Primary Examiner—Robert L. Lindsay
Attorney, Agent, or Firm—Ware, Fressola, Van Der Sluys & Adolphson

[57] ABSTRACT

The invention concerns the method and apparatus to fabricate an oval cross-sectional optical waveguide which only allows light to propagate in one direction of polarization. The optical waveguide preform for such an optical waveguide according to the modified chemical vapor deposition (MCVD) process is produced in such a way, that cooling is used to provide the substrate tube with an oval or elliptical temperature cooling profile. The apparatus for carrying out the fabrication method includes a cooling device (5) mounted to a support (3) beside a gas burner (4) and consists of two nozzles (10) directed toward the substrate tube (2) so as to direct cooling gas toward the substrate tube as glass layers are deposited thereon to produce core and cladding of the optical waveguide. The nozzles rotate synchronously with the substrate tube.

6 Claims, 2 Drawing Sheets

METHOD AND APPARATUS FOR FABRICATING AN OVAL CROSS-SECTIONAL OPTICAL WAVEGUIDE

TECHNICAL FIELD

The invention concerns a method and apparatus for fabricating an optical waveguide with an oval cross-section and wherein the core and the cladding are vapor deposited to the inside surface of a quartz glass substrate tube.

BACKGROUND OF THE INVENTION

Optical waveguides fabricating processes of the above type are known, (Essay: "Production of preforms for optical fibers" Vol. 62, no. ¾, Electrical Communications of 1988).

The effort in known optical waveguides is concentrated on producing an optical waveguide core with a precisely circular cross-section. Any deviation from the circular geometry of the optical waveguide leads to problems with the propagation of light, and therefore to problems with the transmission of the information.

The light that is used to transmit the information may have two perpendicular directions of polarization, which have equal use in the transmission of information through an optical waveguide with a precisely circular core.

However, with the transmission of information through optical waveguides, instances of application can be envisioned in which only one direction of polarization is desired, and the other direction of polarization is suppressed, because in this way a signal can be routed over a long distance without major interference.

SUMMARY OF THE INVENTION

The basic technical problem of the invention consists of an apparatus and method to produce an optical waveguide in which the light dispersion is preferred in one direction of polarization, while most of the light dispersion is suppressed in the other direction of polarization.

This technical problem is solved by the invention, in that the core and the cladding have an oval cross-section. In such an optical waveguide, the transmission of information is preferred in the direction of polarization that coincides with the direction of the major axis of the oval.

A method and apparatus for fabricating such an optical waveguide is disclosed. The method comprises vapor deposition of glass layers to the inside of a substrate tube of quartz glass, wherein two diametrically opposed surface areas of the substrate tube are cooled during the glass deposition. This cooling greatly inhibits glass deposition on the cooled inside surface areas of the substrate while the remaining inside areas further away from such cooling have correspondingly greater glass deposition, hence resulting in the core and cladding of the optical waveguide produced as having a generally oval or elliptical cross-section. The apparatus for carrying out this method uses a glass lathe to rotatably hold the substrate tube, wherein a gas burner is mounted on a support movable along the substrate tube and consists of two opposite nozzles directed toward the substrate tube. A cooling device supplies cooling gas through the nozzles toward the substrate tube. The cooling device rotates synchronously with the substrate tube as the tube is rotated by the lathe.

BRIEF DESCRIPTION OF THE DRAWINGS

The following explains the invention by means of FIGS. 1 to 3, where.

BEST MODE FOR CARRYING OUT THE INVENTION

Figure 1:
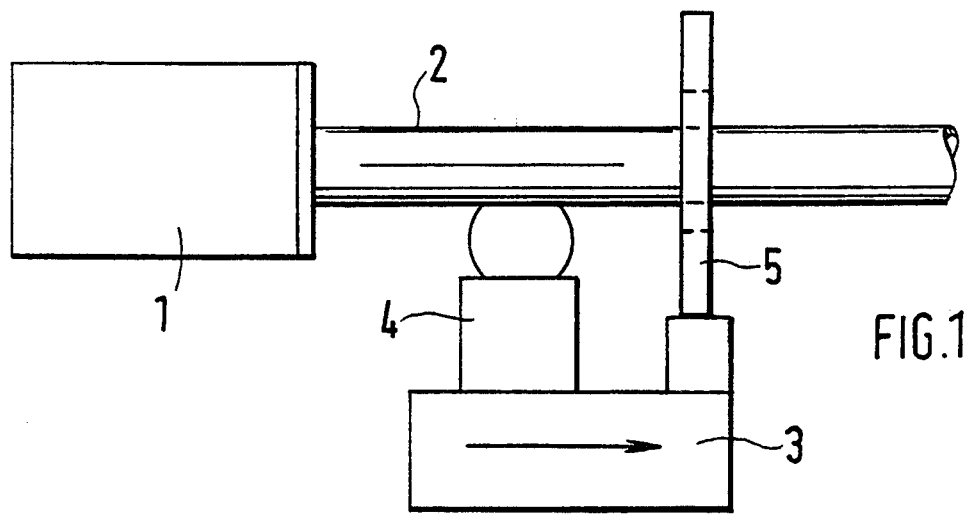
FIG. 1 schematically shows part of a device for producing an optical waveguide preform according to the modified chemical vapor deposition (MCVD) process, with the cooling device according to the invention.

FIG. 1 depicts the part of a device that is essential for understanding the invention, which is used for the production of optical waveguide preforms according to the modified chemical vapor deposition (MCVD) process. It consists of a spindle 1 of a glass lathe, in which the substrate tube 2 is clamped in the chuck, and the artificial glass layers for the core and the outer cladding of the optical waveguide are deposited on the inside surface. The oxyhydrogen gas burner 4 is located on the support 3 and heats the rotating substrate tube 2, thus triggering the 'thermophoretic' process for the production of the artificial glass layers. The cooling device 5 is also located on the support, next to the oxyhydrogen gas burner 4, and cools two diametrically opposed surface areas of the substrate tube 2, as explained below.

Figure 2:
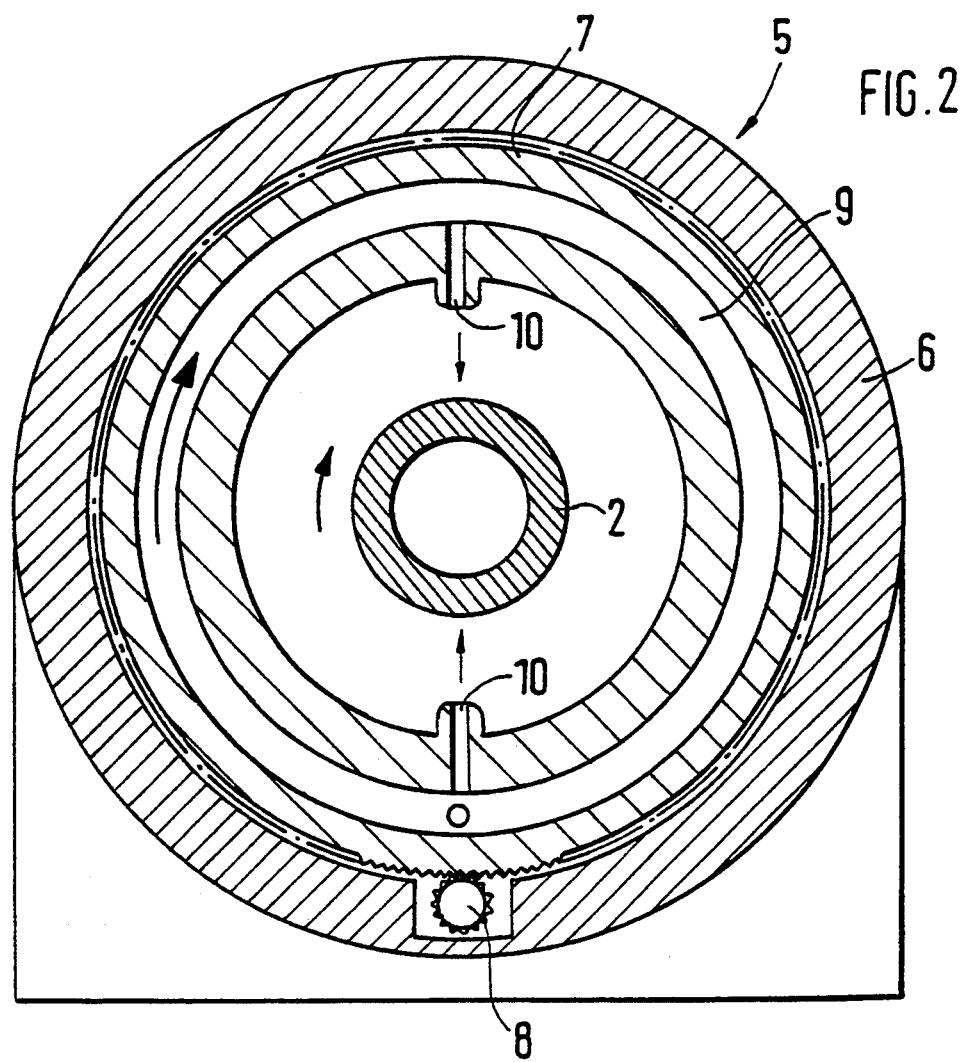
FIG. 2 shows a cross-section of the cooling device according to the invention.

FIG. 2 illustrates the principal construction of the cooling device 5, which contains the fixed ring-shaped housing 6. The wheel 7 can rotate in the housing 6; it has a toothed rim on its periphery, which engages the pinion gear 8. The wheel 7 has an annular channel 9 on the inside, which ends at the nozzles 10 that are directed toward the periphery of the substrate tube 2. Cooling gas, for example nitrogen, is supplied through the annular channel 9 to the nozzles 10. Since the wheel 7 and the substrate tube 2 always rotate synchronously at the same speed, e.g. 30 min$^{-1}$ (30 revolutions/min), the cooling gas from the nozzles 10 is always directed to the same surface areas of the substrate tube 2. The heating of the substrate tube 2 and the simultaneous cooling of certain surface areas produces an elliptical temperature profile in the substrate. For that reason, the artificial glass layers have a corresponding distribution, i.e. an artificial glass layer is produced on the hot inside surface of the substrate tube, and none, or only a small amount of artificial glass, is produced on the cooled inside surface. The core and cladding of an optical waveguide produced with such a preform have an oval or generally elliptical cross-section. In a first approximation, an elliptical optical core only permits the passage of the light in one direction of polarization.

Figure 3:
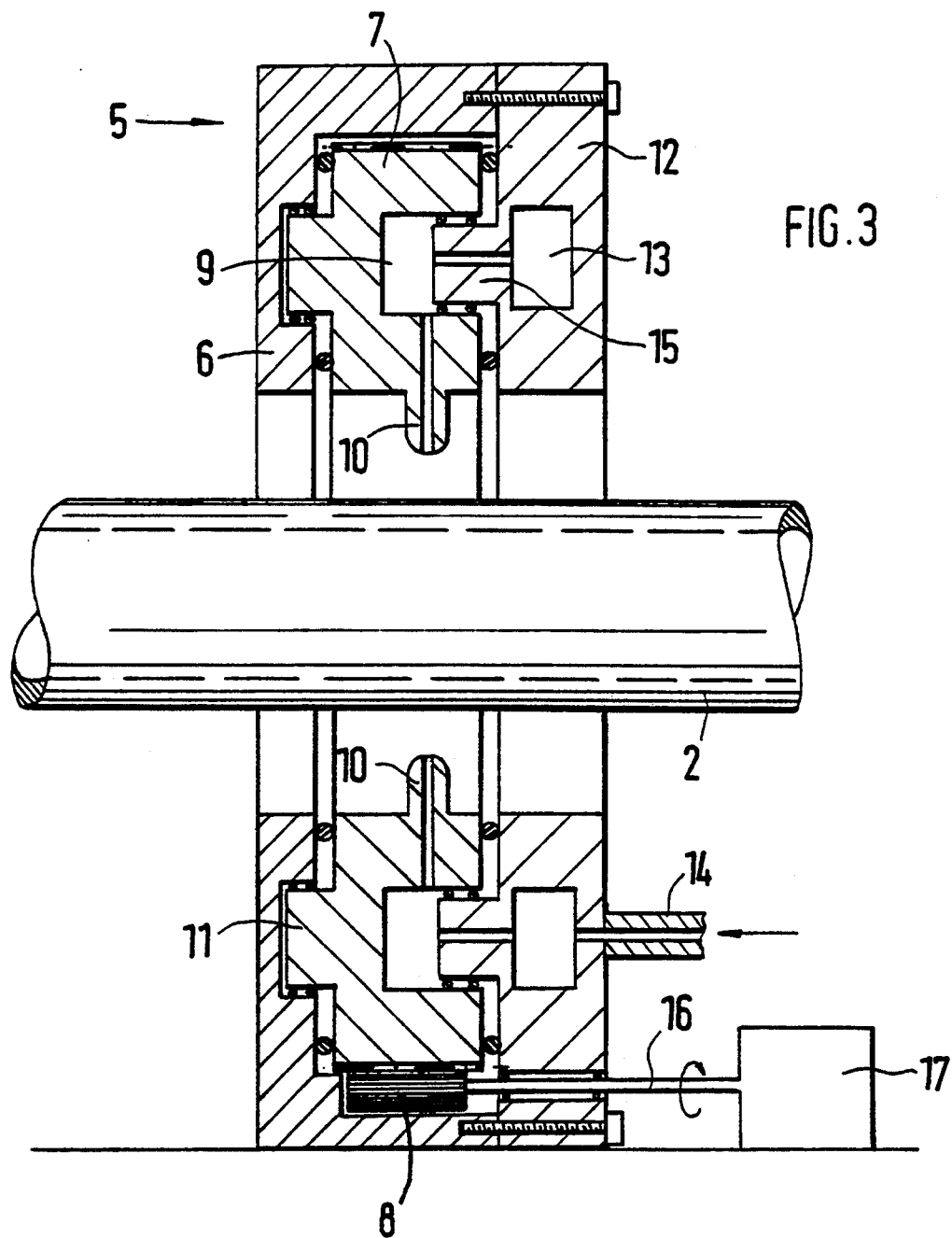
FIG. 3 shows a longitudinal section of the device in FIG. 2.

Details of the cooling device 5 can be found in FIG. 3. The wheel 7 passes through a web 11 in a groove of housing 6. The housing 6 is closed by a housing cover 12, which also contains an annular channel 13. On one side, this annular channel 13 is connected with a cooling gas tank through a tube line 14, and on the other it is connected with the annular channel 9 through branch connection 15. The pinion gear 8 is coupled to the motor 17 by shaft 16.

I claim:

1. A method of fabricating a preform for an optical waveguide with an oval cross-section comprising the steps of:

forming a core and a cladding of the optical waveguide by vapor deposition of glass layers to an inside surface of a substrate tube of quartz glass; and cooling simultaneously two diametrically opposed surface areas of the substrate tube during deposition of the glass layers.

2. A method according to claim 1, wherein the step of forming includes rotatably holding the substrate tube (2) in a spindle of a glass lathe, and movably a gas burner (4) mounted on a support (3) along the substrate tube (2), and wherein the step of cooling includes positioning a cooling device (5) mounted on the support (3) beside the gas burner (4), directing two opposite nozzles (10) of the cooling device (5) toward the substrate tube (2), and rotating synchronously the two opposing nozzles (10) with the substrate tube (2).

3. An apparatus for fabricating a preform for an optical waveguide with an oval cross-section, the optical waveguide having a core and a cladding formed by vapor deposition of glass layers to an inside surface of a substrate tube (2), comprising:

a spindle for rotatably holding the substrate tube (2);

a gas burner (4) mounted on a support (3) is movable along the substrate tube (2); and a cooling device (5) mounted on the support (3) beside the gas burner (4) and having two opposite nozzles (10) directed toward the substrate tube (2), said cooling device (5) being rotatable synchronously with the substrate tube.

4. An apparatus as claimed in claim 3, wherein the cooling device (5) further comprises a fixed, ring-shaped housing (6) containing a rotatable wheel (7) including an annular channel (9) which communicates with two radially inwardly directed nozzles (10) and with an annular channel (13) in a housing cover (12).

5. An apparatus as claimed in claim 4, characterized in that the cooling device (5) further comprises a fixed, ring-shaped housing (6) containing a rotatable wheel (7) having an annular channel (9) which communicates with two radially inwardly directed nozzles (10) and with an annular channel (13) in a housing cover (12).

6. An apparatus for fabricating an optical waveguide with an oval cross-section having a core with a high index of refraction and an outer cladding with a high index of refraction, comprising:

a spindle (1) for rotatably holding a substrate tube (2) having glass layers with materials deposited inside to form the core and the outer cladding;

a gas burner (4) for heating the substrate tube (2) to trigger a thermoplastic production of the core and the outer cladding; and a cooling device (5) having two opposite nozzles (10) that direct cooling gas on two diametrically opposing surfaces of the substrate tube (2) and that rotate synchronously with the substrate tube (2) so the cooling gas is always directed towards the two diametrically opposing surfaces.

* * * * *